United States Patent Office 3,538,037
Patented Nov. 3, 1970

3,538,037
STABILIZED POLYUREA ELASTOMER
COMPOSITION
Hideo Matsushita, Itami, Mamoru Nitta, Toyonaka, and Kazuo Fukada, Takarazuka, Japan, assignors to The Toyo Rubber Industry Co., Ltd., Osaka, Japan
No Drawing. Continuation-in-part of application Ser. No. 377,101, June 22, 1964. This application Oct. 11, 1967, Ser. No. 674,665
Claims priority, application Japan, Aug. 23, 1963, 38/44,790
Int. Cl. C08g 51/34, 51/36, 51/56
U.S. Cl. 260—31.2
4 Claims

ABSTRACT OF THE DISCLOSURE

Novel solvent systems are provided consisting of a rhodanate and a ketone or ester compound. Also provided are storage-stable polymer solutions prepared by utilizing such solvent systems, and methods for preparing such solutions.

---

This application is a continuation-in-part of application Ser. No. 377,101, filed June 22, 1964.

This invention relates to a method of manufacturing storage-stable polymer solutions based on a polyurea elastomer, and more particularly, to a method of manufacturing the polymer solutions utilizing a new type of solvent system comprising an ammonium rhodanate (thiocyanate) or rhodanate of an alkali metal, and a ketone or ester compound.

FIELD OF INVENTION

The designation "polyurea elastomers" mentioned in this invention signifies those elastic and substantially linear polyureas of high molecular weight which are obtained by the reaction of difunctional, relatively low molecular weight organic compounds, e.g. polyalkylene ether glycols or polyester glycols having a molecular weight of from 400 to 5000, with a molar excess of organic diisocyanate, to obtain a prepolymer having terminal isocyanate groups, and then chain extending the prepolymer with an organic diamine, i.e. hydrazine derivatives, etc.

These segmented polyurea elastomers are known to show excellent performances in uses for elastic fibers, films, fiber treating agents, leather coating agents, synthetic leathers, etc.

PRIOR ART

One of the defects in prior attempts to manufacture a solution of polyurea elastomers was that only an extremely limited number of solvents could be used. Examples of these solvents include such nitrogen substituted amides as N,N-dimethyl formamide and N,N-dimethyl acetamide; such sulfoxides as dimethyl sulfoxide; certain halogenated hydrocarbons such as methylene dichloride; some cyclic ethers such as tetrahydrofuran; and "cellosolves" such as ethylene glycol methyl ether acetate and tetramethylurea. Furthermore, the solubility of these solvents is greatly affected by the kind and quantity of glycols, diisocyanates and diamines used, and thus there have developed considerable restrictions with the above-mentioned solvents.

In some cases, mixed solvents, such as acetone and N,N-dimethyl formamide, or tetrahydrofuran and N,N-dimethyl formamide were also used, but nitrogen substituted amides and sulfoxides have been commonly used for practical purposes.

These solvents, however, are generally polar solvents of high boiling point and difficult to volatilize, and so, as in the case of wet spinning, in which the polymer is coagulated in water, the process of recovering the solvents from the coagulation bath is complicated. To recover these solvents from the coagulation bath, it has been necessary to decrease the pressure or raise the temperature, and the solvents are partially decomposed during this process due to oxidation or hydrolysis.

There have also been attempts at utilizing concentrated aqueous solutions of inorganic salts, such as rhodanates, which dissolve polyacrylonitrile, without using these relatively expensive organic solvents, but not even a sign of dissolution was observed. The present inventors have also traced the literature concerning the use of tetrahydrofuran as a solvent for polyurea elastomers. As a result, it was discovered that tetrahydrofuran dissolves only those polyurea elastomers which contain a relatively small number of urea linkages, or have an extremely high molecular weight between the two nitrogen atoms of the employed diamine. These materials consequently have low tensile strength, low melting point, and slow coagulation rate in water. While it may be assumed that dissolution of polyurea elastomers could be considered in relation to the dissolving mechanism of such polymers as polyacrylonitrile and polyamides containing highly polar linkages, these polyurea elastomers in fact indicate a tendency considerably different from that of such polymers. The reason for this is assumed to be that, unlike polyamides, polyacrylonitrile, etc., in which amide groups and nitrile groups, having much cohesive energy and contributing to the intermolecular force of the hydrogen bond, are distributed at regular intervals, polyurea elastomers are comprised of segments concentrated with urea groups, urethane groups, and aromatic nuclei rich in cohesive energy, and segments of polyether or polyester poor in cohesive energy, which are distributed in clusters and so render it more difficult to choose a suitable solvent for them.

According to the research of the inventors, it cannot be generally said that every polar solvent may be caused to dissolve polyurea elastomers by the addition of inorganic salts. For example, nitriles, nitro compounds, organic halides, pyridines, acid anhydrides and tertiary amines are solvents which have a polar group and yet are unable to dissolve polyurea elastomers, even when combined with an inorganic salt.

An advantage of this invention over the prior art is that a method of preparing polymer solutions is provided, wherein such polymer solutions are storage-stable.

BRIEF SUMMARY OF THE INVENTION

This invention provides a novel, and compared with the conventional type, a cheaper solvent system for polyurea elastomers, and also provides a method of manufacturing storage-stable polymer solutions of useful and versatile polyurea elastomers as well as the polymer solutions per se. Moreover, the organic solvents used in this invention have industrially useful properties because they have a generally low boiling point, and thus may be easily recovered.

This invention pertains to the discovery that a useful and homogenous polymer solution may be produced by using as the solvent system, for the polyurea elastomer, a mixture consisting of at least one ammonium or metallic rhodanate and at least one saturated, unsubstituted ketone or ester.

DETAILED DESCRIPTION

For the solvent system of this invention, numerous different combinations of constituents are possible. Depending upon combinations of ketones, esters and rhodanates, the dissolving power of the solvent system will vary, and their quantitative relationship may also be effected.

The polyurea elastomer of this invention is manufactured by the reaction of polyalkylene ether glycol or polyester glycol, having a molecular weight of 400–5000, with 1.05–2.00 molar ratio of organic diisocyanate against one mole of the glycol, to produce a prepolymer containing unreacted isocyanate groups at both ends of the chain, and then chain-extending the prepolymer with an organic diamine or hydrazine to obtain a high molecular compound. In the general case, a prepolymer is prepared by heating at a temperature of 60–120° C., without using a solvent. However, the chain-extending reaction with a diamine is more easily carried out in a solvent. This may be the solvent system of the present invention. In such case, wherein a rhodanate is employed in the chain-extending reaction, it should be dry, although this requirement may be relieved if, as in Example 2, special considerations are met. In Example 2, consideration is so given that the isocyanate terminated prepolymer comes in contact with water only when it reacts with the diamine. Practically all the isocyanate group will react with the amino group rather than water, due to the remarkable difference in the reacting speeds of the isocyanate group and the amino group, compared to the isocyanate group and water.

If the rhodanate solution of the present invention is used in the solvent system for highly polymerized polyurea elastomers, no special dehydration procedure is necessary. However, its storage calls for special attention so that the rhodanate will not be deliquesced by absorbing excessive water.

The amount of polyurea elastomer soluble in the solvent system of this invention extends over a wide range, and appropriate concentrations may be chosen, depending on such factors as viscosity, drying properties, etc. Depending on the specific solvent system, a polyurea elastomer solution containing up to 85% by weight of polyurea elastomer may be prepared, although the invention is not particularly limited thereby.

It is to be noted that the organic diamines, mentioned in this invention, refer to diamines in a broad sense of the term, including such aliphatic, aromatic and heterocyclic diamines as ethylenediamine, propylene diamine, piperazine, p-phenylenediamine and methylenedianiline, but the diamines used in this invention include, of course, hydrazine, and derivatives or organic diamines and hydrazine. In general the organic diamines contain from 2 to 8 carbon atoms between the two nitrogen atoms.

The polyalkylene ether glycols and polyester glycols preferably employed in this invention include compounds having 3 to 5 carbon atoms between the ether or ester group, e.g. polypropylene ether glycol, polytetramethylene ether glycol, polypropylene-CO-tetramethylene ether glycol, polyethylene adipate glycol, polyethylene-CO-propylene adipate glycol, polytetramethylene adipate glycol, poly-ε-caprolactone glycol, all of which are preferred examples. Compounds other than those mentioned above, for example the polyurea elastomer from polyethylene ether glycol (molecular weight 1500), which was prepared by modifying the molecular weight using dibutylamine corresponding to 10% of the equivalent weight of diamine, may also be used.

The appropriate ketones used in this invention are lower aliphatic, saturated, unsubstituted ketones, such as acetone, methylethyl ketone, diethyl ketone and diisopropyl ketone. In respect to dissolving power, as revealed by experiment in this invention, acetone and methylethyl ketone indicate the best efficacy, while it was noted that ketones of more than 10 carbon atoms are not suitable for the purposes of this invention.

The appropriate esters used in this invention are lower aliphatic, saturated, unsubstituted esters of alkanoic acids such as methyl-, ethyl-, propyl-, and isopropyl esters of formic acid, acetic acid and propionic acid, and also saturated, unsubstituted cyclic esters of hydroxy alkanoic acids such as γ-butyrolactone and ε-caprolactone. Esters prepared from fatty acids and alcohols of more than 3 carbon atoms, or cyclic esters of more than 6 carbon atoms are not suitable for the purposes of this invention.

Though not essential, it has been confirmed that these solvents may be mixed with each other, or with such other solvents as N,N-dimethyl formamide, dimethyl sulfoxide, etc., without giving adverse effect to the solubility of the polyurea elastomers.

The appropriate rhodanates used in this invention are rhodanates of ammonium and alkali metals, such as NaSCN, KSCN and LiSCN.

In order to assure the efficacy of the solvent system, it is important that the metallic or ammonium rhodanate(s) be uniformly dissolved in the ketone(s) and ester(s).

The concentration of rhodanates, used in this invention, is from slightly above $\frac{1}{40}$ mole per mole of the ketone or ester up to the saturation point. However, in this case, they may be used up to the upper limit of the saturation concentrations or within the range permitted by the dissolution of the rhodanates. In most cases the solubility of polyurea elastomers shows its maximum at a specific concentration of rhodanates which will vary depending upon the particular salt and particular polyurea elastomer employed. If a salt solution of too high a concentration is used in dissolving polyurea elastomers, turbidity may result in the polymer solution.

In this invention, high molecular compounds other than polyurea elastomers may be used in conjunction with the polyurea elastomers. Examples of these compounds are polyvinyl chloride, polyvinyl acetate, cellulose acetate, polyamide, acrylonitrile-butadiene-styrene resin, chloroprene rubber, nitrile rubber, etc., or modified products of these compounds.

It is also possible of course to add pigments, plasticizers, etc., if necessary or desirable.

The present invention is described in more detail in the following examples thereof.

EXAMPLE 1

A polyurea elastomer was prepared beforehand and its solubility was examined.

Polytetramethylene ether glycol having an average molecular weight of 1000 was reacted with 2,4-toluene diisocyanate at 110° C. for 2 hours in a molar ratio of 1:2, and 400 g. of prepolymer, thus obtained, was placed in a separable flask. To this was added 1200 g. of N,N-dimethyl formamide passed through a column filled with molecular sieve. The mixture was stirred at room temperature for 15 minutes to dissolve it. The free isocyanate of this solution was 1.60%. A mixture of 16 g. of anhydrous ethylene-diamine, and 45 g. of N,N-dimethyl formamide, was added dropwise to above mentioned solution at room temperature over a period of 5 minutes, and a higher viscous solution was promptly obtained. When this was diluted to a 20% solution with N,N-dimethyl formamide, it had a viscosity of 6950 cps. at 25° C.

To 250 g. of this 20% solution was added 60 g. of methanol, and the resultant mixture was poured into cold water (about 10° C.) being stirred at high speed in a juice mixer. The volume ratio between the cold water and the added solution was at least 10:1.

The finely divided powder thus prepared was washed in water, and dried in a vacuum at 60° C. for 10 hours, in the presence of a flow of nitrogen gas. The result was a light moxa-like powder.

Using such a polymer having great surface area, dissolution test can be made in quite a short time. This polymer is called "Polymer A."

Polypropylene ether glycol with an average molecular weight of 1000 was reacted with diphenylmethane-4,4'-diisocyanate at 80° C. for 2 hours at a molar ratio of 1:2, and 400 g. of prepolymer, thus obtained, was placed in a separable flask. To this was added 1200 g. of anhydrous N,N-dimethyl formamide, similarly as in the preparation of "Polymer A." The mixture was then stirred at about 80° C. for 15 minutes, and dissolved.

The free isocyanate of this solution was 1.01%.

A solution obtained by dissolving 7.3 g. of hydrozine hydrate, and 1.52 g. of dibutylamine, in 50 g. of N,N-dimethyl formamide, was added dropwise to the above solution at room temperature. The viscosity increased gradually during addition, while after total addition, the viscosity of the resultant solution was about 2020 cps. at 25° C.

This was diluted to about 2 times with acetone, and was then poured into about 10 times the volume of cold water being stirred at a high speed in a juice mixer. A powdered polymer was thus obtained.

This polymer was dried, similarly as in the case of "Polymer A." This product is called "Polymer B."

Dissolution test (I).—To 5 g. of acetone was added an inorganic salt (variable g.), and determination was made whether or not 0.5 g. of the polymer would be dissolved.

LiSCN (0.5): About ½ dissolved
NaSCN (0.5): Completely dissolved
KSCN (0.1): Remained undissolved portions
KSCN (0.3): Completely dissolved
KSCN (0.5): Completely dissolved
KSCN (0.8): Remained undissolved portions
$NH_4SCN$ (0.1): Remained undissolved portions
$NH_4SCN$ (0.3): Completely dissolved
$NH_4SCN$ (0.5): Completely dissolved
$NH_4SCN$ (0.8): Completely dissolved
$NH_4SCN$ (1.0): Completely dissolved
$NH_4SCN$ (1.5): Completely dissolved
$NH_4SCN$ (2.0): Remained undissolved portions As indicated in the above instances, in the concentrations of salts, there is an upper limit and a lower limit. In the neighborhood of midway between these limits, polymer was dissolved up to such a concentration (above 35%), that stirring became difficult.

Polymer B

KSCN (0.5): Completely dissolved
$NH_4SCN$ (0.5): Completely dissolved
$NH_4SCN$ (0.8): Completely dissolved (II).—*Other solvents were also examined*. In the cases of methylethyl ketone, ethyl formate, methyl acetate, γ-butyrolactone and ε-caprolactone, 0.5 g. of "Polymer A" was added to a mixture of 5 g. of solvent, and 0.5 g. of KSCN. After shaking for several minutes, all were dissolved. In the cases of ethyl acetate, methylisobutyl ketone and butyl butyrate, no dissolution took place unless with heating, and even then, when cooled to room temperature, it became heterogeneous, though the solution phase was more or less viscous.

EXAMPLE 2

Polytetramethylene ether-CO-propylene ether glycol (molar ratio, 70:30), having an average molecular weight of 1000, was reacted with 2,4-toluene diisocyanate at 110° C. for 2 hours at 1:2 molar ratio, and a prepolymer was obtained. The free isocyanate of this polymer was 6.31%.

Seventy g. of acetone, 10 g. of KSCN and 0.902 g. of ethylene diamine were placed in a separable flask, stirred and dissolved. To this was added, over a period of 20 minutes, a mixture of 20 g. of the above-mentioned prepolymer and 20 g. of dry acetone. The viscosity increased accordingly, until after total addition, it reached a value of 1980 cps. at 25° C. When this solution was poured into water, a white, tough polymer coagulated.

EXAMPLE 3

One mole of polytetramethylene ether glycol (molecular weight: 1,000) was reacted with 2.5 moles of 2,4-toluene diisocyanate for 3 hours at 90° C., and the prepolymer thus obtained was made into a 20% N,N-dimethyl formamide solution. One mole of ethylenediamine was added to the solution and reacted at 20–30° C.

The polyurea elastomer, thus obtained, was diluted to a 10% solution with N,N-dimethyl formamide solution, and it was coagulated in water under agitation, and dried in the form of a solid polymer.

When 20 g. of this polyurea elastomer was put in a mixed solvent of 49 g. of acetone, 21 g. of ethyl acetate and 10 g. of potassium thiocyanate, it dissolved uniformly.

What is claimed is:

1. A liquid composition comprising a homogeneous solution of (a) at least one polyurea elastomer, (b) at least one member selected from the group consisting of (1) a lower aliphatic, saturated, unsubstituted ketone containing up to 10 carbon atoms, (2) a lower aliphatic, saturated, unsubstituted ester of an alkanoic acid, said acid containng up to 3 carbon atoms and the total number of carbon atoms in the ester being from 3 to 6 carbon atoms, and (3) a saturated, unsubstituted cyclic ester of a hydroxy alkanoic acid containing up to 6 carbon atoms, and (c) at least one ammonium or alkali metal rhodanate, the amount of rhodanate present being in the range of from about $\frac{1}{40}$ mole per mole of the ketone or ester present up to the saturation point.

2. A liquid composition in accordance with claim 1 wherein the ketone employed is acetone.

3. A liquid composition in accordance with claim 1 wherein a mixture of acetone and ethyl acetate is employed in conjunction with potassium thiocyanate.

4. A liquid composition in accordance with claim 1 wherein in the polyurea elastomer is a substantially linear polyurea elastomer prepared by chain-extending an isocyanate-terminated polyurethane prepolymer with a diamine.

References Cited

UNITED STATES PATENTS 3,068,188  12/1962  Beste et al. _____ 260—30.2
3,179,618   4/1965  Roberts _____ 260—34.2

FOREIGN PATENTS 1,021,533  12/1957  Germany.

MORRIS LIEBMAN, Primary Examiner

R. H. ZAITLEN, Assistant Examiner

U.S. Cl. X.R.

260—30.4, 31.2, 32.8